United States Patent Office 3,756,819
Patented Sept. 4, 1973

3,756,819
PHOTOGRAPHIC MORDANTS
Robert A. Sinclair and Louis A. Errede, Harlow, England, assignors to Minnesota Mining and Manufacturing Company
No Drawing. Filed June 14, 1971, Ser. No. 153,045
Claims priority, application Great Britain, June 15, 1970, 28,943/70
Int. Cl. G03c 1/84
U.S. Cl. 96—48 R
4 Claims

ABSTRACT OF THE DISCLOSURE

A polymeric material useful for mordanting dyes in a photographic element, the polymeric material containing recurring quaternary ammonium groups which have covalently bonded to the nitrogen atoms thereof allyl groups.

This invention relates to a polymeric material which is capable of mordanting anionic dyes. In particular the invention relates to a polymeric material which is suitable for mordanting anionic dyes in a layer of a photographic material and later releasing the dye when required.

BACKGROUND TO THE INVENTION

It is often necessary for photographic materials to consist, not only of one or more layers of photosensitive silver halide emulsion, but also one or more coloured layers. Usually these coloured layers are required during the exposure of the photographic material to a light image and thereafter the coloured layers must be destroyed before or during processing so as to give an undistorted developed image.

One example of such a coloured layer is that known as an anti-halation layer. These layers may be positioned closest to the photographic support and under one or more light-sensitive silver halide layers. They are intended to absorb any residual light after it has passed through the light sensitive layer so preventing this light from being reflected back through the superimposed silver halide layers and blurring the image. These anti-halation layers contain a coloured dye which absorbs the residual light. Once the photographic material has been exposed to the light image, however, the colour of the anti-halation layer must be destroyed so as to avoid its distorting the appearance of the final image. Accordingly the anti-halation layer should contain a material which is capable of mordanting the dye until after the material has been exposed to the light image. At some stage thereafter the dye should be removed as quickly and as completely as possible.

It is, therefore, an object of this invention to provide a polymeric material which is suitable for use inter alia in such anti-halation layers and which effectively mordants the dye until after the photographic material has been exposed to the light image and thereafter releases the dye quickly and substantially completely.

BRIEF DESCRIPTION OF THE INVENTION

According to the invention there is provided a polymeric material containing recurring quaternary ammonium groupings which have covalently bonded to the nitrogen atoms thereof an allyl including a substituted allyl group.

Preferably the polymeric material is a homopolymer or copolymer having pendent side chains terminated by quaternary ammonium groupings, one substituent of which is an allyl or substituted allyl group.

Preferably the other substituents of the quaternary ammonium groupings are not bulky e.g. hydrogen atoms or lower alkyl groups such as methyl groups.

We find that such polymeric materials act as excellent mordants for anionic dyes and can effectively prevent the dyes from diffusing into adjacent layers of photographic materials. Once, however, these polymeric materials plus anionic dyes are treated with an alkaline material, such as for example the developer solution for a photographic material, there is rapid decomposition of the polymeric material. The decomposition products appear to be a dialkyl amino homopolymer or copolymer and allyl alcohol or a substituted allyl alcohol or an hydroxy homopolymer or copolymer and an unsaturated amine for example, the decomposition can be illustrated by one or other of the following equations in the case of one particular example of a polymeric according to the invention:

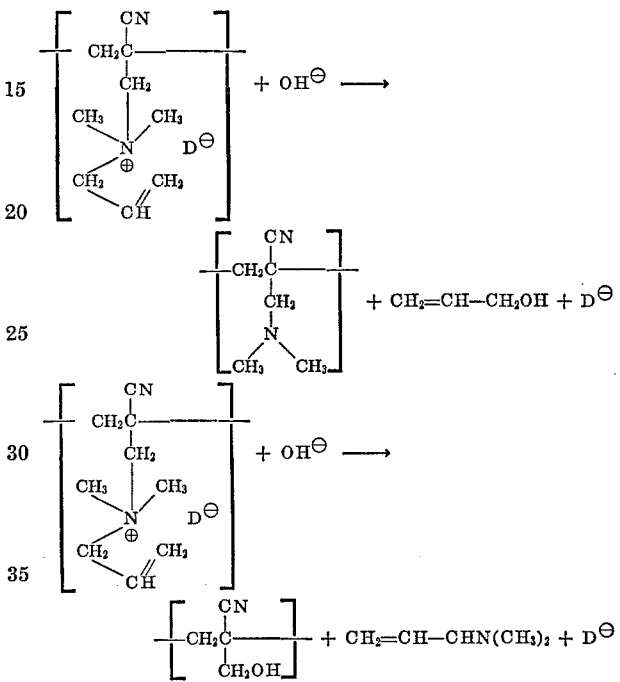

where D⁻ represents an anionic dye ion.

As can be seen the decomposition products are uncharged and so the anionic dye, which was previously immobilized by being strongly attracted electrically to the quaternary ammonium grouping, is released and can be washed out of the photographic material more or less completely. In this respect the polymeric materials according to the invention have an important advantage over prior materials which have been used to mordant dyes in that the above decomposition almost instantly destroys the attraction between the dye molecules and the polymeric material. In prior materials, however, it has often been the case that the attraction between the polymeric material and the dye molecules has not been destroyed by treatment with an alkali but instead the charged dye ions are to be replaced by other charged ions, for example, hydroxyl groups, and this replacement is a very slow process as compared with the decomposition referred to above. Accordingly, the diffusion of the dye molecules from the prior photographic materials is slow and extremely difficult to complete.

It appears that the incorporation of the allyl group attached to the quaternary nitrogen atoms is important in that the relatively small bulk of the allyl groups attached to the quaternary nitrogen atoms reduces the change of steric hindrance to the formation of an insoluble salt with an anionic dye. Accordingly anionic dyes are likely to be retained strongly in the presence of neutral or acid solutions. On the other hand, the allyl groups appear to permit a more ready attack by hydroxyl ions upon the terminal methylene groups than upon the quaternary nitrogen atom and so the polymeric materials according to the invention rapidly decompose as illustrated above when in the presence of alkaline solutions.

An added advantage of the polymeric materials according to the invention is that, because they become uncharged once they have been destroyed by reaction with an alkali, $S_2O_3^{2\ominus}$ groups present in the processing solutions for the photographic material are not attracted to the polymeric materials and retained after completion of processing. This advantage is important because any $S_2O_3^{2\ominus}$ groups retained in photographic materials tend to destroy the silver image by chemical degradation, most frequently to silver sulphide, on prolonged storage.

In order to mordant the dyes in a layer, the polymeric materials should be non-diffusing. Therefore they should normally have an average molecular weight of at least 5,000. Also preferably their average molecular weight does not exceed 50,000.

The polmeric materials of the invention can have a backbone chain composed of repeating groups containing, for example, carbon, oxygen, sulphur and/or nitrogen groups. Preferably, however, the backbone chain contains repeating carbon atoms.

In the preferred polymeric materials according to the invention, the quaternary nitrogen atoms are not directly attached to the backbone chain of the polymer but are attached by means of a divalent linking group such as a single carbon or oxygen atom, or a hydrocarbon chain grouping or an alicyclic or aromatic grouping. It has been found that such materials are excellent mordants for anionic dyes in the presence of neutral or acid solutions.

The nitrogen atoms of the quaternary ammonium groupings can also form part of the backbone chain of the material or be attached directly to the backbone chain of the polymeric material. It is found, however, that materials where the nitrogen atoms are attached directly to the backbone chain do not retain or mordant the dye molecules as well as those materials where the quaternary nitrogen atoms are attached by means of a divalent linking group to the backbone chain of the polymer, although in some instances such materials would be suitable when it is a requirement that the dye be partially released upon washing with neutral or acidic solutions followed by substantially complete removal by treatment with alkaline solutions.

According to one embodiment of the invention, the polymeric materials contain recurring, and preferably consecutive monomeric units of the formula:

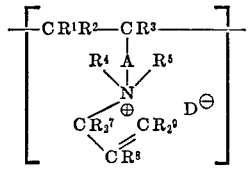

in which $R^1$ and $R^2$, each independently represents a hydrogen atom, an alkyl including substituted alkyl, aryl including substituted aryl group, $R^3$ represents any of the atoms or groups represented by $R^1$ or a cyano or carbalkoxy group, $R^4$ and $R^5$, each independently represents a hydrogen atom or lower alkyl group or $R^4$ and $R^5$ together with the included nitrogen atom represent atoms necessary to complete a heterocyclic ring, A represents a divalent hydrocarbon including substituted hydrocarbon group or the groups —O—,

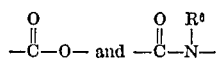

wherein $R^6$ represents a hydrogen atom or an alkyl group, or A represents atoms which with $R^4$ and $R^5$ form with the included nitrogen atom a heterocyclic ring such as a pyridine ring which may be directly or indirectly attached to the carbon atom to which the grouping $R^3$ is attached, each $R^7$ independently represents a hydrogen atom or a methyl group, preferably the former, $R^8$ represents a hydrogen atom, a lower alkyl, cyano or lower carbalkoxy, e.g. carbethoxy group, each $R^9$ represents a hydrogen atom or a lower alkyl group, and $D^\ominus$ represents a negatively charged atom or group which is an anionic dye ion when the materials of the invention are used to mordant an anionic dye.

These polymeric materials are compatible with gelatin and can be readily coated on the usual photographic substrates to form clear, uniform, clearly defined under or over layers for photographic gelatin emulsions.

The polymeric materials according to the invention can be prepared from suitable homopolymers or copolymers having recurring amino groups by reaction with an allylating agent such as, for example, allyl bromide, to give the corresponding recurring quaternary side groups, one substituent of which is the desired allyl group. One group of homopolymers or copolymers having pendent amino side groups which can be converted to polymeric materials according to the present invention are described in our copending British patent application Nos. 28961/70 and 31976/70 and 41639/68.

The first listed application No. 28961/70, relates to polymers having recurring, preferably consecutive groups of the formula:

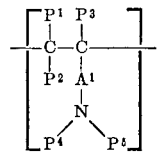

in which each of $P^1$ and $P^2$ independently represent a hydrogen atom, an alkyl including substituted alkyl group, an aryl including substituted aryl group, $P^3$ is an electronegative group such as a cyano, carbalkoxy or perfluoroalkyl, each of $P^4$ and $P^5$ independently represent an alkyl group, or $P^4$ and $P^5$ represent atoms necessary to form with the nitrogen atom a heterocyclic ring, and $A^1$ represents a divalent hydrocarbon including substituted hydrocarbon radical, or $A^1$ together with $P^4$ and $P^5$ represents atoms necessary to form with the included nitrogen atom, a heterocyclic ring such as a pyridine ring which is directly or indirectly attached to the carbon atom to which the grouping $P^3$ is attached.

Such polymers may be prepared by polymerizing a monomer mixture containing monomer to the formula:

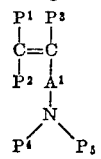

in which $P^1$ to $P^5$ and $A^1$ are as defined above, in the presence of an anionic polymerization catalyst, .eg. KCN, under substantially anhydrous and anaerobic conditions.

Besides being used as mordants in anti-halation layers the polymeric materials of the invention can be used in the preparation of fugitive filter layers such as to mordant a yellow dye in a layer used in place of the colloidal silver layers frequently used in substractive colour photographic materials to correct the lower photographic layers against the action of blue light to which they are sensitive.

The invention will now be illustrated by the following examples.

EXAMPLE 1

Preparation of:

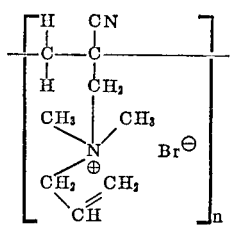

Poly-2-dimethylaminomethylacrylonitrile was prepared as follows:

High vacuum manipulation techniques were required to achieve the requisite degree of purity of reactants. The solvent, dimethylformamide (20 g.), was purified by vacuum distillation from CaH$^2$ and P$_2$O$_5$ and condensed on to a catalytic amount of vacuum-dried NaCN (100 mg.) at −190° C. The mixture was warmed to room temperature, still under vacuum, and stirred magnetically until the catalyst had dissolved. Next, DMAN (20 g.), purified by successive vacuum distillations from P$_2$O$_5$ and CaH$_2$ was condensed on to the NaCN dimethylformamide and brought to 40° C.

After stirring for seferal minutes the solution was pale yellow and has increased in viscosity. If high conversion to polymer had not occurred due to remaining trace impurities, then the unreacted monomer and solvent could have been distilled on to fresh catalyst, without exposure to air to effect the required polymerisation.

The viscous yellow solution was poured into water to precipitate the polymer, which was further purified by forming the polyhydrochloride salt and neutralising with alkali to reprecipitate. The purification could alternatively be achieved by dissolving in acetone and reprecipitating in water.

A polymer yield up to 80% was achieved with a molecular weight of at least 6,000.

*Analysis.*—Calculated (percent): C, 65; H, 9.1; N, 25.5. Found (percent): C, 65.0; H, 8.7; N, 25.6.

I.R. analysis: This confirms that the functional amine and nitrile groups were intact. The relevant peaks due to C—H stretching frequencies in the dimethylamino groups occurred at 2780 and 2989 cm.$^{-1}$, the nitrile stretching mode was at 2230 cm.$^{-1}$ and in addition to vinylic=CH$_2$ out of plane deformation at 950 cm.$^{-1}$ was absent.

The thus prepared polymer was quaternised by heating with excess allyl bromide in a sealed evacuated glass tube. Initially, the polymer dissolved completely; then the solution became more viscous as quaternisation took place and, after 75 minutes at 100° C., a clear amber glass had formed. The excess allyl bromide was then pumped off, fractionated and weighed. This allowed a quantitative measure of conversion (typically 70–80%).

The resulting quaternary polymer was added to 4% gelatin in water at 60 to 70° C. and the solution vigorously mixed with the acid anti-halation dye tartrazine. The final polymer mordant concentration was in the range 0.5 to 1.25% and the dye concentration was 0.25%. This dye composition was cooled, macerated and washed several times with water to remove any excess reactant before coating 2μ thick on polyester base. A 1% iodide, 0.23μ grain-size iodo-bromide photo-emulsion was applied over the anti-halation layer. Under neutral conditions, or at low pH, the dye was firmly retained in the underlayer. Absence of migration to the silver halide emulsion layer was demonstrated both by microscopic examination of thin sections and by lack of significant change in sensitivity of the film. Treatment of the film with a Phenidone hydroquinone developer at a pH of about 10 rapidly destroyed the quaternised polymer, with consequent release of the dye. Residual stain was very low.

A further advantage of this polymer is the low retention of thiosulphate ion after fixing, as shown in the following comparisons:

| Concentration of polymer (g./100ml.) | 0.00 | 0.25 | 0.50 | 0.75 | 1.00 | 1.25 |
|---|---|---|---|---|---|---|
| Micrograms sodium thiosulphate/in.$^2$ after 5 minutes wash | 2.2 | 0.0 | 1.8 | 2.9 | 2.2 | 3.0 |

U.S. Federal and British Standard Specification for residual thiosulphate concentration require a maximum of 5.0μg./in.$^2$, and as can be seen these results are well below that limit.

EXAMPLE 2

Preparation of:

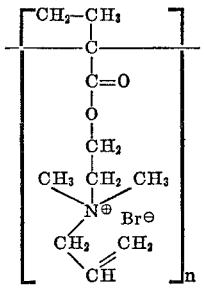

Poly(β-dimethylaminoethylmethacrylate) was prepared by a method similar to that of Example 1 and was then quaternised with allyl bromide to near 100% conversion. This reaction occurred smoothly on adding excess allyl bromide to an acetone solution of polymer.

The quaternary derivative was compatible with gelatin and was evaluated in exactly the same manner as described in Example 1. The results were directly comparable, at similar polymer concentration, in that at first the dyes were firmly mordanted in the presence of neutral or acid solutions but were later readily released upon treatment with an alkaline developer.

EXAMPLE 3

Preparation of:

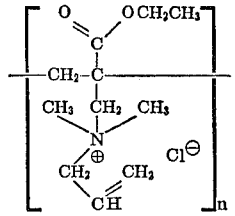

Ethyl-α-dimethylaminoethylacrylate (20 g.) was dissolved in acetone (25 ml.) and excess allyl chloride (45 g.) added. After 48 hours at room temperature the quaternary salt was collected, rapidly washed with dry acetone and finally freed of solvent in a rotary film evaporator.

*Analysis.*—Found (percent): C 54.0; H, 8.1; N, 5.7; Cl, 14.8. Calculated (percent): C, 56.4; H, 8.6; N, 6.0; Cl, 15.2.

This monomer (21 g.) was dissolved in freshly distilled water (10 g.), azoisobutyronitrile catalyst (0.053 g.) added and the solution out-gassed three times before increasing the temperature to 80° C. Polymerization took place rapidly and after ½ hour the viscous solution was poured into acetone and the separated plastic polymer recovered and dried in vacuo. This product also possessed the desirable photographic mordant properties outlined in Example 1.

EXAMPLE 4

Preparation of:

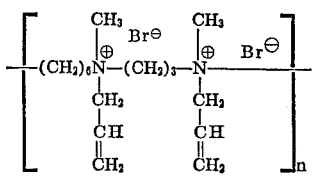

Poly-[linear hexamethylene-bis-methylamino-trimethylene] was dissolved in acetone. An excess amount of allyl bromide was added and the resulting mixture allowed to react at room temperature for two days to give the quaternary salt. This was then separated by filtration and washed with fresh acetone.

The resulting polymer was soluble in water and completely compatible with gelatin.

It was evaluated in exactly the same way as described in Example 1. Films cast from the quaternised polymer in gelatin were excellent mordants for anoinic dyes. Once immersed in alkaline solutions, however, the dye was released quickly and completely diffused out of the film. Thereafter the film could not be stained with anoinic dyes because of the destruction by the alkali of the quaternary ammonium centres which had been responsible for mordanting the dye.

EXAMPLE 5

Preparation of the allyl quaternised copolymer of styrene and 2-dimethylaminomethylacrylonitrile The 1 to 1 copolymer styrene and 2-dimethylaminomethylacrylonitrile was prepared as follows:

Sodium-dried THF (250 g.) was distilled directly into the reaction vessel, and a few drops of the lithium naphthalene catalyst were added until a permanent green colouration persisted. A further 9 ml. catalyst were then added to give a total of 14.4 millimoles and the solvent chilled to $-70°$ C. Then 22 g. of styrene were directly charged to the catalyst solution, whereupon the green colour soon changed to the deep red-brown colour characteristic of the styrene anion. Next, the temperature was raised slowly to $-35°$ C. and DMAN (22.6 g.) added. The colour immediately changed to a greenish brown and polymer precipitated.

The thus prepared polymer (100 g.) was dissolved in chloroform (0.5 l.), and allyl bromide (150 g.) was added. The resulting solution was allowed to react at reflux temperature for 24 hours. During this time, the product separated from solution as a semi-solid mass. The liquid was removed by decantation and the viscous mass was leached with anhydrous ether to give a friable product. The solid powder was dissolved in ethanol (0.5 l.) and reprecipitated by dropwise addition to 5 litres of anhydrous ether. The resulting white powder was collected by filtration, washed with ether and dried in vacuo at room temperature.

The product was water soluble, gelatine compatible and an excellent mordant which compared favourably with the polymer of Example 1.

When the 1 to 1 copolymer of ethyl-α-dimethylaminomethyl acrylate and styrene was quaternised as described above, the resulting quaternised copolymer had comparable mordanting properties to the polymer of Example 1.

EXAMPLE 6

Preparation of the allyl quaternised copolymer of methyl methacrylate and α-dimethylaminomethylacrylonitrile The 1 to 1 copolymer of methyl methacrylate and α-dimethylaminoethylacrylonitrile was prepared as follows:

One mole of methyl methacrylate (90 g.), one mole of α-dimethylaminoethylacrylonitrile (114 g.), and a tenth of a mole of azobisisobutyronitrile. The solution was allowed to react at 50° C. for 48 h. to effect polymerization and the product isolated. The weight of product isolated was 165 g. and it contained 12.5% N which corresponds to a one to one copolymer. This conclusion was also confirmed by its infrared spectrum and neutral equivalent. The inherent viscosity was equal to 0.30.

The thus prepared copolymer was dissolved in acetone and quaternised with an excess of allyl bromide on the manner described in Example 5. The product had excellent compatibility with gelatin and was an excellent mordant for anionic dyes. The capacity to mordant anionic dyes was immediately destroyed by immersion of the product in alkaline solutions, thereby causing release of the mordanted dye.

The 1 to 1 copolymer of ethyl-α-dimethylaminomethylacrylate and methyl methacrylate was quaternised as described above to give a product with similar properties.

EXAMPLE 7

Preparation of:

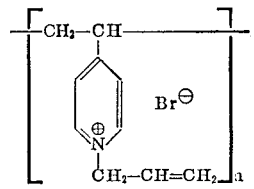

Poly[4-vinylpyridine] (20 g.) was dissolved in ethyl alcohol and reacted with allyl bromide (40 g.) at room temperature. After 12 hours the product was isolated by precipitation into petroleum ether and dried in vacuo.

*Analysis.*—Found (percent): C, 50.4; H, 5.3; N, 5.94; Br, 27.71. Calculated for 100% conversion (percent): C, 53.1; H, 5.3; N, 6.2; Br, 35.4.

The product was water soluble, compatible with gelatin and was an excellent mordant for anionic dyes. Immersion in aqueous alkali caused instant release of the dye and destruction of the quaternary grouping so that, thereafter, the product could not again be stained with anionic dyes.

As can be seen from these examples, the polymeric materials of the invention form excellent mordants for anionic dyes until treated with alkali, whereupon the dyes are immediately and completely released. In addition, once the polymeric materials of the invention have been treated with alkali they do not tend to retain thiosulphate ions.

We claim:

1. A photographic material containing one or more layers of photographic silver halide emulsion and at least one layer containing one or more anionic dyes which are mordanted in that layer by a polymeric material which contains quaternary ammonium groups and which is characterized by having an allyl group covalently bonded to the nitrogen of said quaternary ammonium groups:

2. A photographic material according to claim 1 in which the said layer containing said anionic dye or dyes is positioned beneath all of the silver halide emulsion layers and acts as an antihalation layer.

3. A photographic material according to claim 1 wherein quaternary ammonium groups are present in the polymeric material as repeating monomeric units having the general formula

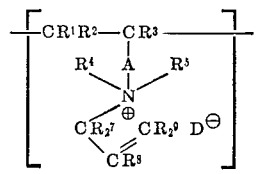

in which $R^1$ and $R^2$, each independently represent a hydrogen atom, an alkyl group or an aryl group, $R^3$ represents any of the atoms or groups represented by $R^1$ or a cyano or carbalkoxy group, $R^4$ and $R^5$, each independently represent a hydrogen atom or lower alkyl group or $R^4$ and $R^5$ together with the included nitrogen atom represents atoms necessary to complete a heterocyclic ring, A represents a divalent hydrocarbon group, or the groups

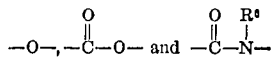

wherein $R^6$ represents a hydrogen atom or an alkyl group, or A represents atoms which with $R^4$ and $R^5$ form with the included nitrogen atom a heterocyclic ring which may be directly or indirectly attached to the carbon atom to which the grouping $R^3$ is attached, each $R^7$ independently represents a methyl group or a hydrogen atom, $R^8$ represents a hydrogen atom, a lower alkyl, cyano or lower carbalkoxy group, each $R^9$ represents a hydrogen atom or a lower alkyl group, and $D^-$ represents a negatively charged atom or group.

4. A process for the photographic development of a photographic material containing one or more layers of photographic silver halide emulsion and at least one layer containing one or more anionic dyes which are mordanted in that layer by a polymeric mateiral which contains quaternary ammonium groups and which is characterized by having an allyl group covalently bonded to the nitrogen atom of said quaternary ammonium groups which comprises the treatment of said material with an alkaline developer which treatment converts the quaternary ammonium groups of the polymeric material to the corresponding amno groups with the consequent release of the anionic dye.

References Cited

UNITED STATES PATENTS 3,625,694  12/1971  Cohen et al. _____ 96—84 A

FOREIGN PATENTS 685,475  1/1953  Great Britain _____ 96—84 A

RONALD H. SMITH, Primary Examiner

U.S. Cl. X.R.

96—57, 84 A; 260—85.5